(12) United States Patent
Lang et al.

(10) Patent No.: US 10,239,454 B2
(45) Date of Patent: Mar. 26, 2019

(54) CAMERA SYSTEM FOR A VEHICLE

(71) Applicants:Werner Lang, Ergersheim (DE); Andreas Redlingshoefer, Trautskirchen (DE); Jaap-Jan Snel, Ergersheim (DE)

(72) Inventors: Werner Lang, Ergersheim (DE); Andreas Redlingshoefer, Trautskirchen (DE); Jaap-Jan Snel, Ergersheim (DE)

(73) Assignee: MEKRA LANG GMBH & CO. KG, Ergersheim (DE)

( * ) Notice: Subject to any disclaimer, the term of this patent is extended or adjusted under 35 U.S.C. 154(b) by 111 days.

(21) Appl. No.: 15/145,468

(22) Filed: May 3, 2016

(65) Prior Publication Data

US 2016/0325679 A1 Nov. 10, 2016

(30) Foreign Application Priority Data

May 4, 2015 (DE) ........................ 10 2015 005 697

(51) Int. Cl.
*H04N 5/232* (2006.01)
*B60R 1/00* (2006.01)
*H04N 5/33* (2006.01)
*H04N 5/225* (2006.01)
*H04N 9/04* (2006.01)

(52) U.S. Cl.
CPC ............. *B60R 1/00* (2013.01); *H04N 5/2256* (2013.01); *H04N 5/23293* (2013.01); *H04N 5/332* (2013.01); *H04N 9/04* (2013.01); *B60R 2300/103* (2013.01); *B60R 2300/30* (2013.01); *B60R 2300/8046* (2013.01)

(58) Field of Classification Search
CPC ..... H04N 5/23293; H04N 5/2256; B60R 1/00
See application file for complete search history.

(56) References Cited

U.S. PATENT DOCUMENTS

| 6,104,431 A | 8/2000 | Inoue et al. | |
|---|---|---|---|
| 7,767,964 B2 * | 8/2010 | Nakata | ................. H04N 5/2354 250/330 |
| 9,435,922 B2 * | 9/2016 | Choe | ...................... G02B 5/201 |

(Continued)

FOREIGN PATENT DOCUMENTS

| DE | 10 2008 031 593 | 1/2001 |
|---|---|---|
| DE | 10 2011 105 628 | 8/2012 |

(Continued)

OTHER PUBLICATIONS

Office Action dated Sep. 12, 2017 which issued in the corresponding Korean Patent Application No. 10-2016-0055545.

(Continued)

*Primary Examiner* — Tsion B Owens
(74) *Attorney, Agent, or Firm* — Cozen O'Connor

(57) ABSTRACT

A camera system for a vehicle has an image acquisition unit (2) having an image sensor (4), an optical element (3) and at least one IR-blocking filter (5) for acquiring image data of an object, a processing unit processing the image data acquired from the image acquisition unit (2) for displaying the object (7) on a display unit (9), and at least one illumination unit (10) for illuminating the object (7) with light (12) having a wavelength at least partly within the upper region (13) of sensitivity of the human eye and at least partly below the blocking limit of the IR-blocking filter (5).

9 Claims, 5 Drawing Sheets

(56) References Cited

U.S. PATENT DOCUMENTS

| | | |
|---|---|---|
| 2003/0025799 A1 | 2/2003 | Holz et al. |
| 2005/0023465 A1* | 2/2005 | Eggers .................. B60R 1/00 250/330 |
| 2007/0278406 A1* | 12/2007 | Haug .................. B60R 1/00 250/338.1 |
| 2008/0021849 A1 | 1/2008 | Kara |
| 2008/0212849 A1 | 9/2008 | Gao |
| 2009/0295906 A1 | 12/2009 | Kushimoto et al. |
| 2015/0358540 A1* | 12/2015 | Kanter ................. G08G 1/168 348/38 |

FOREIGN PATENT DOCUMENTS

| | | |
|---|---|---|
| DE | 10 2013 001 285 | 7/2014 |
| DE | 10 2013 016 277 | 4/2015 |
| EP | 1 282 097 | 2/2003 |
| EP | 1 562 063 | 8/2005 |
| JP | 07-128579 | 5/1995 |
| JP | 2002-320139 | 10/2002 |
| JP | 2007-516525 | 6/2007 |
| KR | 20120068655 | 6/2012 |
| WO | WO 2005/066684 | 7/2005 |
| WO | WO 2009/046268 | 4/2009 |
| WO | WO 2014/108560 | 7/2014 |

OTHER PUBLICATIONS

Search Report dated Oct. 11, 2016 which issued in the corresponding European Patent Application No. 16164627.8.
Office Action dated Jun. 6, 2017 which issued in the corresponding Japanese Patent Application No. 2016-076327.
Licht ("Light") Wikipedia update/version of Apr. 30, 2015.

\* cited by examiner

CAMERA SYSTEM FOR A VEHICLE

BACKGROUND OF THE INVENTION

1. Field of the Invention

The invention relates to a camera system for a vehicle and can for example be used in a driver assistance system, respectively a mirror substitution system for vehicles, for example commercial vehicles.

2. Description of the Related Art

Commonly known camera systems for vehicles comprise color image sensors for realistic representation of the surroundings of the vehicle in which the camera system is used. By incident infrared light (in the following referred to as IR-light) on the color image sensor, tampering of the color reproduction is possible and, therefore, a representation of the surroundings out of touch with reality. On the other hand, the usage of IR-light improves image brightness in dark surroundings conditions, for example, at night or during a drive through a tunnel In order to suppress the disadvantageous effects of IR-light on color reproduction in bright surroundings conditions on the one side and to utilize the positive effects of IR-light in dark surroundings conditions on the other side, IR-filters are, for example, used in image acquisition units. In particular, IR-filters are used which are mechanically pivotable between first and second positions for suppressing the effects of IR-light at daytime in the first position and for utilizing these effects at night in the second position.

However, such movable IR-filters are difficult for the usage in the field of vehicles, due to movable mechanical parts in combination with strong vibrations during the operation of the vehicle. Such pivotable IR-filters are mechanically complex and error-prone.

On the one side, commonly known camera systems comprise additional spotlights emitting visible light. Such additional spotlights may have a disturbing effect on image reproduction and may not be allowable due to legal requirements relating to the mounting position.

On the other side, commonly known camera systems use an additional IR-illumination at darkness for improving image reproduction, which, however, results in the above-mentioned disadvantages of color distortion at daytime.

Normally, IR-illumination in camera systems is provided in a wavelength range of approximately 850-950 nm, which is invisible for the human eye, because the sensitivity of the human eye is approximately in the range of 380-780 nm.

SUMMARY OF THE INVENTION

An object of the invention is to provide a camera system for a vehicle allowing a detailed image reproduction of the vehicle surroundings at darkness and to realize a minimum effect on color fidelity at brightness.

A camera system according to the invention comprises an image acquisition unit including an image sensor, at least one optical element and at least one IR-blocking filter, for acquiring image data of an object (vehicle surroundings). The image data acquired by the image acquisition unit is processed by a processing unit for displaying the object, respectively the vehicle surroundings on a display which can be viewed by a user of the vehicle.

According to an embodiment of the invention, the camera system comprises an active illumination unit which illuminates the vehicle surroundings, respectively the object which has to be displayed on the display unit with light having a wavelength at least partly in the upper region of sensitivity of the human eye and at least partly below the blocking limit of the used IR-blocking filter.

By using such an illumination unit, it is possible to avoid color distortion in bright surroundings conditions and to ensure optimal detailed image reproduction in dark surroundings conditions.

According to a further development of the invention, the illumination unit illuminates the object with light having a wavelength completely within the upper region of sensitivity of the human eye and completely below the blocking limit of the IR-blocking filter.

According to another embodiment, the illumination unit illuminates the object with light which is at least 50% in the upper region of sensitivity of the human eye.

According to another embodiment of the invention, the illumination unit illuminates the object with light having a wavelength in the upper region of sensitivity of the human eye and partly below the blocking limit of the IR-blocking filter.

According to the above-mentioned different embodiments of the invention, it is possible to ensure that detailed image reproduction is possible in dark surroundings conditions (nighttime) and that color fidelity reproduction of the vehicle surroundings is possible in bright surroundings conditions (daytime).

According to an embodiment of the invention, the used image sensor is preferably a IR-light sensitive color image sensor and the illumination unit is, for example, a laser or comprises one or a plurality of light-emitting diodes. Other commonly known light sources can be used in the illumination unit.

According to an embodiment of the invention, it is defined that the upper region of sensitivity of the human eye begins at 680 nm and ends at approximately 780 nm, wherein the visible range of the human eye is between 380 nm and 780 nm.

According to the inventive configuration of the illumination unit, as mentioned above, the camera system provides detailed image representation in darkness in situations, in which the human eye hardly notices the surroundings. The reason for this is that the image sensor still comprises a significant light sensitivity in the range of emission of the illumination unit and is therefore able to represent a detailed image of the surroundings.

Because the illumination unit according to the invention operates in the upper region of sensitivity of the human eye, it is only hardly noticed by the human eye and is, therefore, not disturbing, so that very low color distortions are generated at brightness because an IR-blocking filter is still used.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Advantageous embodiments of the invention are described in the following by reference to the attached drawings, wherein the same reference signs are used for indicating the same or similar components.

DETAILED DESCRIPTION OF THE PRESENTLY PREFERRED EMBODIMENTS

Figure 1:
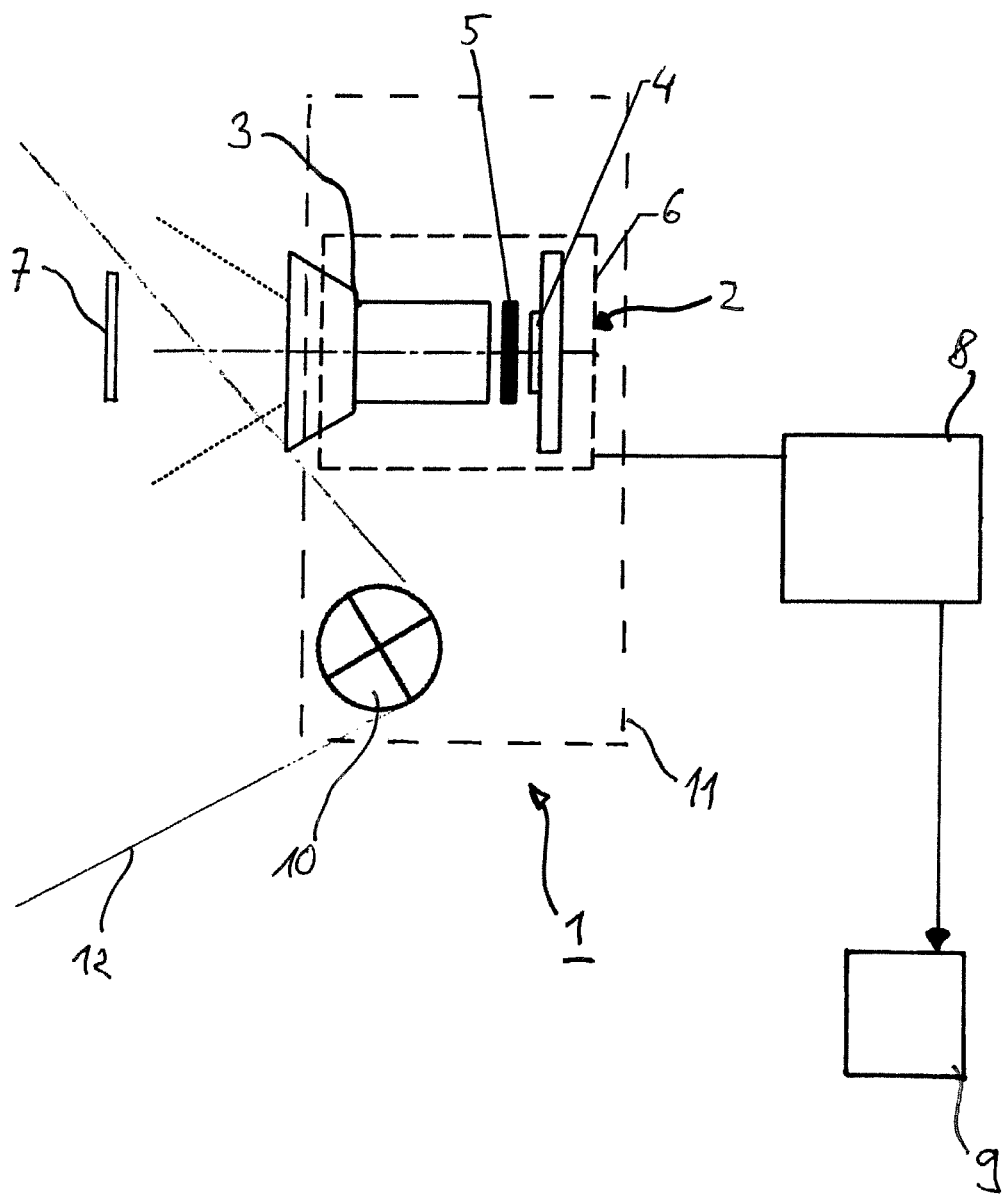
FIG. 1 schematically illustrates a view of a camera system according to the invention.

FIG. 1 shows a camera system 1 according to a preferred embodiment of the invention that comprises an image acquisition unit 2 having an optical element 3 and an image sensor 4. The optical element 3 is, for example, an objective or comprises another optical component through which light can pass into the image acquisition unit 2 from the outside. According to the preferred embodiment of the invention, the image sensor 4 is, for example, an IR-light sensitive color image sensor.

As further shown in FIG. 1, an IR-blocking filter 5 is provided between the optical element 3 and the image sensor 4, having a predetermined characteristic which is explained in detail below with reference to FIGS. 2 to 5.

The IR-blocking filter 5 is provided for ensuring that IR-light is filtered from the light passing through the optical element 3, and is preferably located between the optical element 3 and the image sensor 4.

According to the preferred embodiment of the invention, the optical element 3, the image sensor 4 and the IR-blocking filter 5 are accommodated in a housing 6.

FIG. 1 further shows an object 7 provided outside of the camera system 1, in particular outside a vehicle in which the camera system 1 is used. The camera system 1 is, for example, within or outside a driver's cab for determining an object 7 which is in the surroundings of the driver's cab or a loading space of the vehicle. Image data of the object 7 are acquired by the image acquisition unit 2 and supplied to a processing unit 8. The processing unit 8 performs ordinary image processing to process the image data such that the image data can be displayed to a user (driver) on display device 9. The display device 9 is, for example, an ordinary monitor provided within the vehicle and viewable by the driver of the vehicle.

As shown in FIG. 1, the camera system 1 according to the preferred embodiment of the invention further comprises an illumination unit 10 which is accommodated together with the image acquisition unit 2 in a housing 11. The housing 11 is configured such that light from the illumination unit 10 reaches the object 7 unhindered to illuminate the same. Although not shown in FIG. 1, one or more tilted mirrors, converging lenses, etc. can be provided in the camera system 1 to ensure that the object 7 is sufficiently illuminated by the illumination unit 10.

The illumination unit 10 can further be provided separate or independent from the image acquisition unit 2.

Further, according to another embodiment of the invention, it is possible that the optical element 3, the image sensor 4, the IR-blocking filter 5 and the illumination unit 10 are accommodated in a common housing.

According to the preferred embodiment of the invention, the illumination unit 10 is, for example, an LED or comprises a plurality of LEDs. Alternatively, the illumination unit can comprise a laser.

The illumination unit 10, as shown in FIG. 1, serves for ensuring that an acquired image of the object 7 acquired by the image acquisition unit 2 in the darkness, provides the detailed image reproduction and that an image acquired in the brightness is minimally affected with respect to color fidelity. According to the preferred embodiment of the invention the illumination unit 10 illuminates the object 7 in particular with light 12 having a wavelength at least partly in the upper region of sensitivity of the human eye and at least partly below the blocking limit of the IR-blocking filter 5 as described in detail below with reference to FIGS. 2 to 5.

Figure 2:
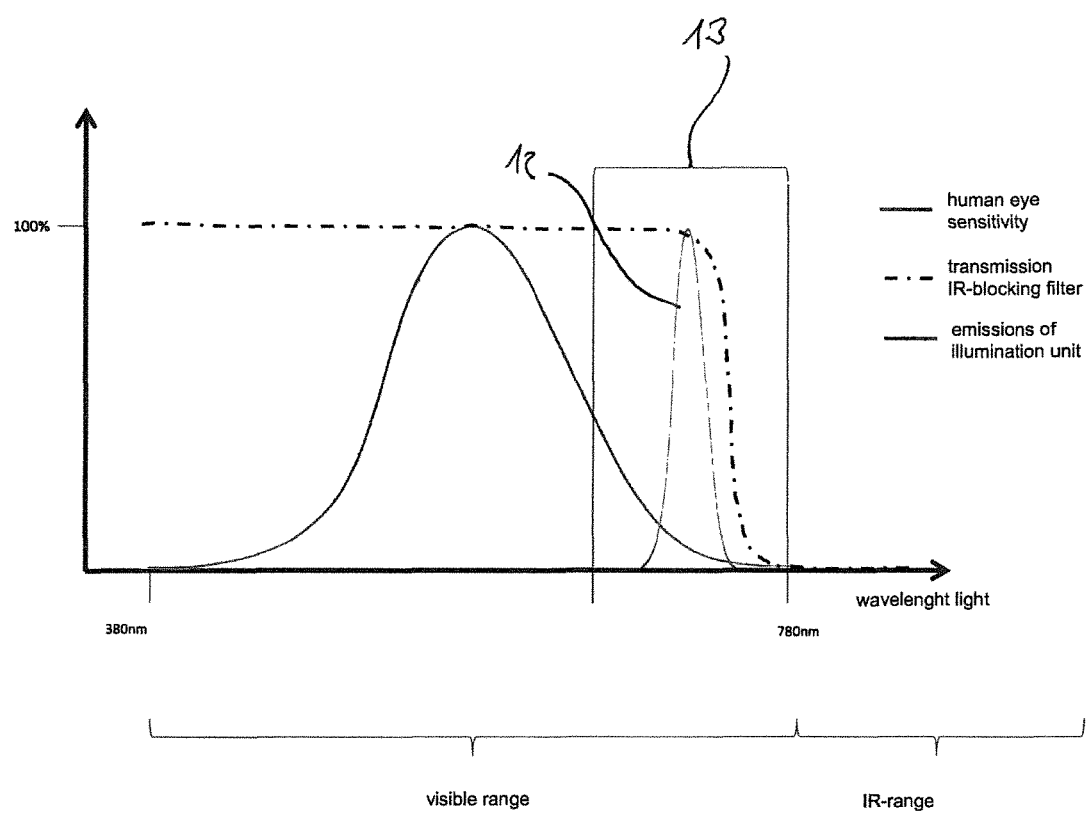
FIG. 2 illustrates a diagram for characterizing the light emitted from the illumination unit according to a first embodiment.

FIG. 2 shows a diagram for characterizing the light emitted from illumination unit 10 according to a first embodiment of the invention.

FIG. 2 shows a range of wavelength in which a human eye is typically sensitive. According to FIG. 2, this range reaches preferably from 380 nm to 780 nm. This range between 380 nm and 780 nm is commonly known as visible range. The range above 780 nm is typically referred to as IR-range.

FIG. 2 further shows an upper border area 13 of sensitivity of the human eye. According to the preferred embodiment, this upper border area 13 starts approximately at 680 nm and ends approximately at 780 nm.

FIG. 2 further shows the characteristic of the IR-blocking filter 5 of FIG. 1 with a dotted line. The IR-blocking filter according to this embodiment is almost 100% IR-transmissive in the range from 380 nm to approximately 730 nm and in the remaining range of wavelengths, as shown in FIG. 2, substantially not IR-light transmissive.

FIG. 2 further shows light 12 emitted from the illumination unit 10. According to this embodiment, light 12 is completely within the upper region 13 of sensitivity of the human eye and completely below the blocking limit of the IR-blocking filter 5. According to this embodiment the blocking limit of the IR-blocking filter 5 is within the upper region 13 of sensitivity of the human eye.

Figure 3:
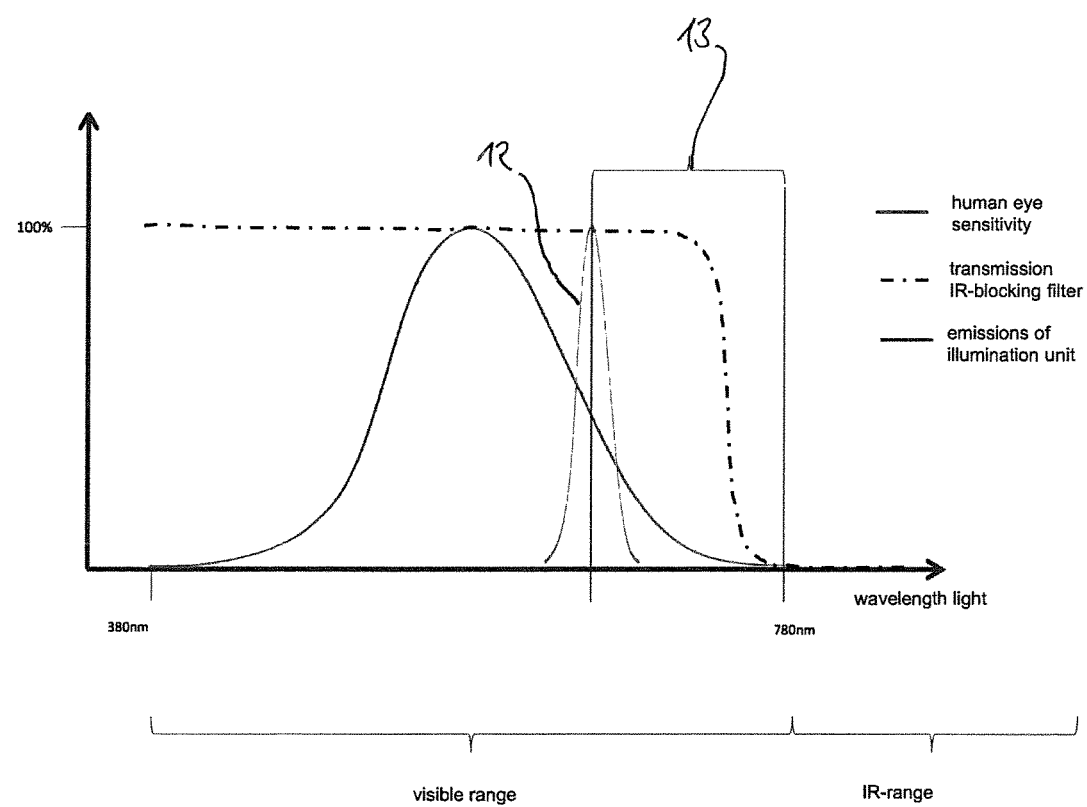
FIG. 3 illustrates a diagram for characterizing the light emitted from the illumination unit according to a second embodiment.

FIG. 3 shows a diagram for characterizing the light emitted from the illumination unit 10 according to a second embodiment of the invention.

In contrast to the first embodiment shown in FIG. 2, the light 12 emitted from the illumination unit 10 is partly in the upper region 13 of sensitivity of the human eye and completely below the blocking limit of the IR-blocking filter 5. In particular, according to this embodiment the illumination unit 10 illuminates the object 7 of FIG. 1 with 50% of light 12 in the upper region 13 of the sensitivity of the human eye.

Figure 4:
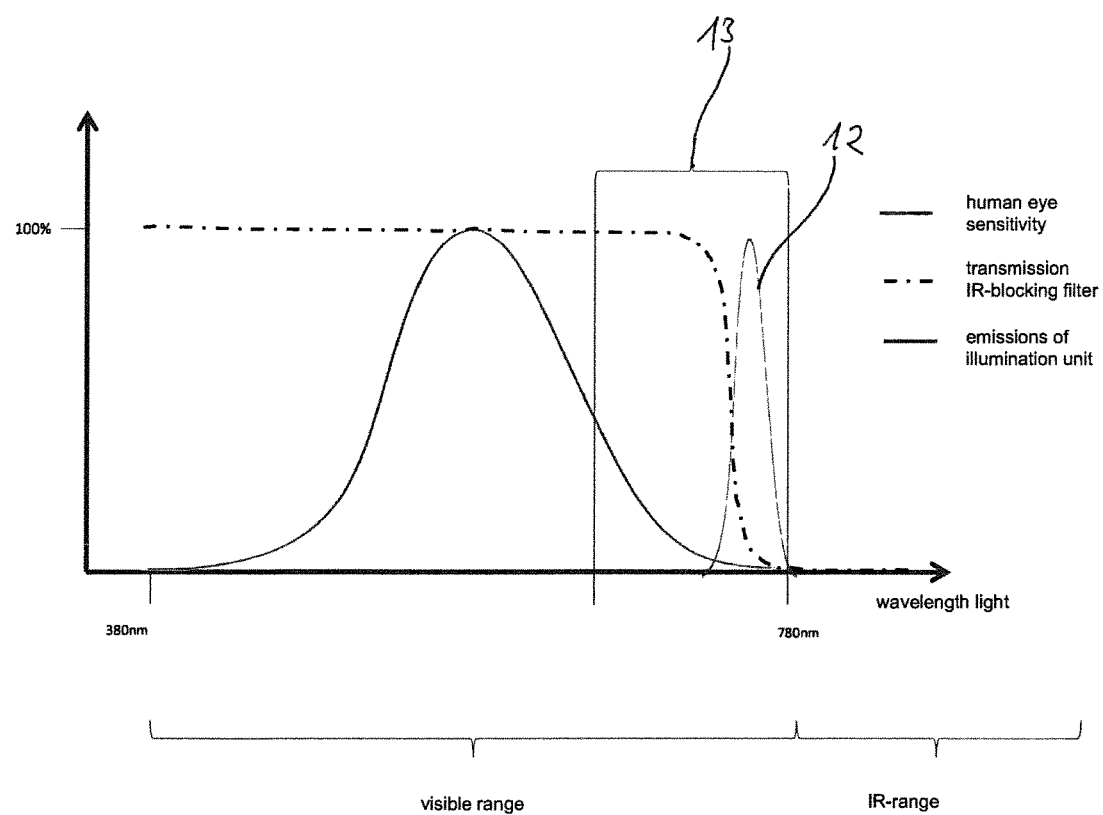
FIG. 4 illustrates a diagram for characterizing the light emitted from the illumination unit according to a third embodiment.

FIG. 4 shows a diagram for characterizing the light 12 emitted from the illumination unit 10 according to a third embodiment of the invention.

According to this embodiment, the object 7 shown in FIG. 1 is illuminated with light 12 having a wavelength completely within the upper region 13 of sensitivity of the human eye and partly below the blocking limit of the IR-blocking filter 5.

Figure 5:
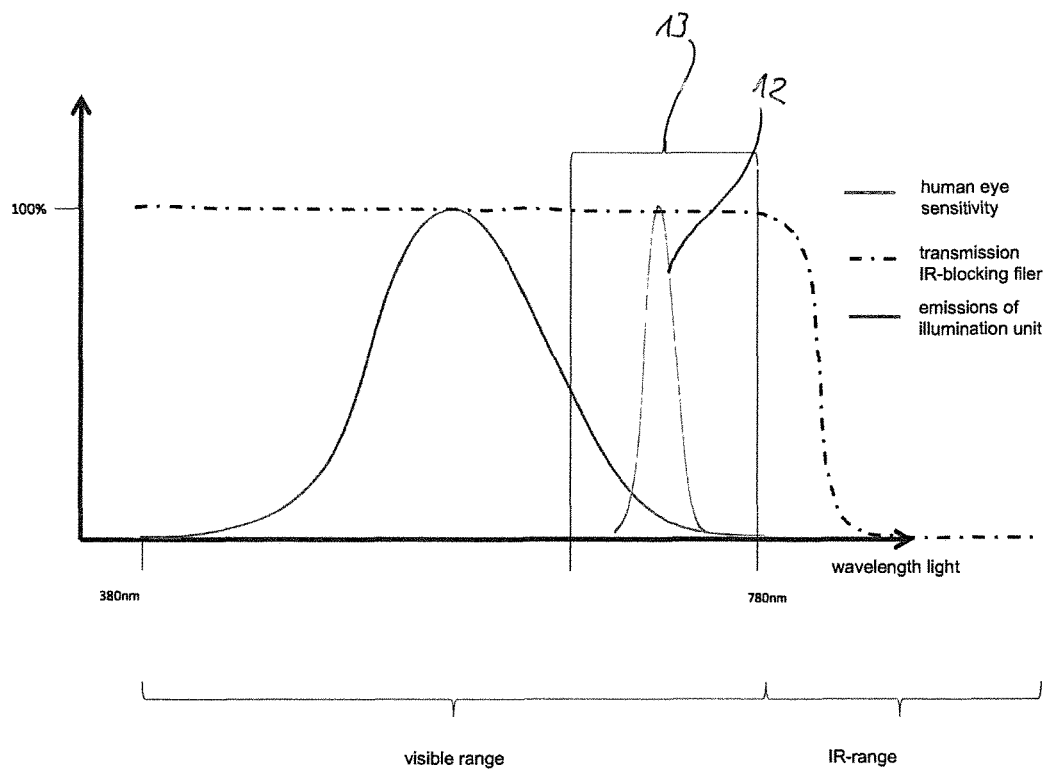
FIG. 5 illustrates a diagram for characterizing the light emitted from the illumination unit according to a fourth embodiment of the invention.

FIG. 5 shows a diagram for characterizing the light 12 emitted from the illumination unit 10 according to a fourth embodiment.

Similar to the embodiment shown in FIG. 2, the object 7 shown in FIG. 1 is illuminated with light having a wavelength completely within the upper region 13 of sensitivity of the human eye and completely below the blocking limit of the IR-blocking filter 5. According to this embodiment, the IR-filter 5 completely passes IR-light in the visible range (380 nm to 780 nm), so that its blocking limit is within the IR-range, i.e. in contrast to the embodiments of FIGS. 2 to 4, outside the upper region 13 of sensitivity of the human eye.

Although different embodiments have been described in FIGS. 2 to 5 for characterizing the light emitted from the illumination unit 10 for illuminating the object 7 of FIG. 1, all embodiments have in common that the camera system 1 can provide an image in the darkness in situations in which the human eye can hardly notice the surroundings, because the image sensor 4 still comprises a significant light sensitivity in the range of emission of the illumination unit 10 and is therefore capable of generating an image of the surroundings. Because the illumination unit 10 operates in the upper region 13 of sensitivity of the human eye, the emitted light is only hardly noticed by the human eye and is therefore not disturbing. Because in addition an IR-blocking filter is used, a very low effect on color fidelity can be observed in bright conditions.

Although the invention has been described with reference to preferred embodiments in the above, it is of course possible to perform modifications without leaving the scope of the invention.

A plurality of image acquisition units in the camera system according to the invention are, for example, possible. Further, a plurality of illumination units can be provided which illuminate an object outside the vehicle with light according to the invention. Although a single IR-blocking filter has been described in the above, a plurality of IR-blocking filters with the same or similar blocking limits can be used.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A camera system for a vehicle comprising:
an image acquisition unit comprising an image sensor, an optical element and at least one IR-blocking filter for acquiring image data of an object;
a processing unit processing the image data acquired by the image acquisition unit for displaying the object on a display unit; and
at least one illumination unit for illuminating the object with light having a wavelength entirely within or partly below the upper region of sensitivity of the human eye comprising the range between about 680 nm to about 780 nm and entirely below or partly below a blocking limit of the IR-blocking filter,
wherein below the blocking limit the IR-blocking filter is 100% IR-transmissive in the range from 380 nm to 730 nm and not IR-light transmissive in the remaining range of wavelength.

2. The camera system according to claim 1, wherein the illumination unit illuminates the object with light having a wavelength within the upper region of sensitivity of the human eye and below the blocking limit of the IR-blocking filter.

3. The camera system according to claim 1, wherein the illumination unit illuminates the object with at least 50% of light within the upper region of sensitivity of the human eye.

4. The camera system according to claim 1, wherein the illumination unit illuminates the object with light having a wavelength within the upper region of sensitivity of the human eye and partly below the blocking limit of the IR-blocking filter.

5. The camera system according to claim 1, wherein the blocking limit of the IR-blocking filter is within the upper region of sensitivity of the human eye.

6. The camera system according to claim 1, wherein the blocking limit of the IR-blocking filter is outside the upper region of sensitivity of the human eye in the IR-range.

7. The camera system according to claim 1, wherein the image sensor is an IR-light sensitive color image sensor.

8. The camera system according to claim 1, wherein the illumination unit comprises a laser.

9. The camera system according to claim 1, wherein the illumination unit comprises one or a plurality of light-emitting diodes (LEDs).

* * * * *